US010803907B2

(12) United States Patent
Schroeder et al.

(10) Patent No.: US 10,803,907 B2
(45) Date of Patent: Oct. 13, 2020

(54) STORAGE DEVICE CARRIER AND RELATED SYSTEMS AND METHODS

(71) Applicant: Seagate Technology LLC, Cupertino, CA (US)

(72) Inventors: Christopher Ellis Schroeder, Erie, CO (US); Steven L. Weber, Ramsey, MN (US); Anil Koyad Choyikkunnil, Bangalore (IN); Anwar Maliyamveetil Ibrahim, Thiruvananthapuram (IN)

(73) Assignee: Seagate Technology LLC, Fremont, CA (US)

( * ) Notice: Subject to any disclaimer, the term of this patent is extended or adjusted under 35 U.S.C. 154(b) by 828 days.

(21) Appl. No.: 15/356,920

(22) Filed: Nov. 21, 2016

(65) Prior Publication Data

US 2018/0146569 A1    May 24, 2018

(51) Int. Cl.
*G06F 1/18* (2006.01)
*G11B 33/02* (2006.01)
*G11B 33/12* (2006.01)

(52) U.S. Cl.
CPC ............ *G11B 33/027* (2013.01); *G06F 1/187* (2013.01); *G11B 33/124* (2013.01); *G11B 33/128* (2013.01)

(58) Field of Classification Search
CPC .................................................... G06F 1/187
USPC .................................................... 361/679.33
See application file for complete search history.

(56) References Cited

U.S. PATENT DOCUMENTS

| 5,668,696 | A | | 9/1997 | Schmitt | |
|---|---|---|---|---|---|
| 6,058,016 | A | * | 5/2000 | Anderson | G06F 1/184 312/223.2 |
| 6,266,248 | B1 | * | 7/2001 | Hanas | H05K 7/1409 361/752 |
| 6,406,312 | B1 | | 6/2002 | Heitkamp | |
| 6,490,153 | B1 | | 12/2002 | Casebolt et al. | |
| 6,525,935 | B2 | | 2/2003 | Casebolt | |
| 6,556,432 | B2 | | 4/2003 | Chen et al. | |
| 6,560,098 | B1 | * | 5/2003 | Beinor, Jr. | G11B 33/128 248/562 |
| 6,636,422 | B1 | * | 10/2003 | Tanzer | G11B 33/022 312/332.1 |
| 6,798,650 | B2 | * | 9/2004 | Reznikov | G11B 33/122 312/223.1 |

(Continued)

OTHER PUBLICATIONS

Supermicro, "Carrier for SuperStorage Server 6048R-E1CR90L" San Jose, California, USA. Believed available on or before Oct. 2016; 2 pages.

*Primary Examiner* — Adrian S Wilson
(74) *Attorney, Agent, or Firm* — Mueting Raasch Group

(57) ABSTRACT

A rack enclosure system includes a receiving frame and a carrier. The carrier is configured to capture a storage device and to be slidably received by the receiving frame in a mounting direction. The carrier includes a first rail and a second rail each extending between a front end and a back end. The carrier also includes a cap member. The cap member may be rotatably or non-rotatably connected to the first rail at the front end. The cap is releasably connected to the second rail adjacent to the front end. The carrier further includes a handle with a cam portion and a latch portion. The cam portion is rotatably connected to the cap member and optionally the first rail. The latch portion is releasably connected to the cap member or the second rail.

19 Claims, 14 Drawing Sheets

(56) References Cited

U.S. PATENT DOCUMENTS

| | | | | |
|---|---|---|---|---|
| 6,912,124 B2* | 6/2005 | Megason | ............... | F16H 51/00 165/104.33 |
| 7,016,190 B1* | 3/2006 | Chang | ................... | G06F 1/184 235/381 |
| 7,035,096 B2* | 4/2006 | Franz | ..................... | G06F 1/184 312/223.1 |
| 7,139,166 B2* | 11/2006 | Marcade | ................ | G06F 1/187 361/679.32 |
| 7,483,268 B1* | 1/2009 | King, Jr. | ................. | G06F 1/187 248/682 |
| 7,495,904 B2* | 2/2009 | Liang | ..................... | G06F 1/187 361/679.39 |
| 7,515,410 B1* | 4/2009 | Dingfelder | ............. | G06F 1/187 361/679.33 |
| 7,609,511 B2* | 10/2009 | Peng | .................... | G11B 33/128 248/633 |
| 7,684,182 B2* | 3/2010 | Zhang | .................. | G11B 33/123 16/258 |
| 7,701,706 B2* | 4/2010 | Peng | .................... | G11B 33/124 248/633 |
| 7,701,707 B2* | 4/2010 | Peng | .................... | G11B 33/128 248/618 |
| 7,782,606 B2* | 8/2010 | Baker | .................... | G06F 1/187 312/223.1 |
| 8,243,435 B2* | 8/2012 | Li | ........................ | G11B 33/124 312/223.2 |
| 8,456,832 B1 | 6/2013 | Brigham, Jr. et al. | | |
| 8,717,753 B2* | 5/2014 | Keffeler | ............... | H05K 7/1487 29/830 |
| 8,749,966 B1* | 6/2014 | Boudreau | ............... | G06F 1/187 361/679.33 |
| 9,727,099 B1* | 8/2017 | Hastings | ................ | G06F 1/187 |
| 9,785,205 B2* | 10/2017 | Lien | ........................ | G06F 1/187 |
| 9,915,983 B2* | 3/2018 | Yu | ............................ | G06F 1/187 |
| 9,958,912 B2* | 5/2018 | Chen | ........................ | G06F 1/187 |
| 2001/0001529 A1* | 5/2001 | Behl | .................... | G11B 25/043 312/223.1 |
| 2003/0206402 A1* | 11/2003 | Tsuyuki | ............... | G11B 33/128 361/725 |
| 2007/0206351 A1* | 9/2007 | Szelong | .................... | G06F 1/18 361/726 |
| 2007/0211422 A1* | 9/2007 | Liu | ......................... | G06F 1/187 361/679.37 |
| 2008/0013272 A1* | 1/2008 | Bailey | ..................... | G06F 1/187 361/679.33 |
| 2008/0278856 A1* | 11/2008 | Peng | .................... | G11B 33/124 360/244.3 |
| 2009/0059507 A1* | 3/2009 | Peng | .................... | G11B 33/124 361/679.33 |
| 2009/0103252 A1* | 4/2009 | Peng | .................... | G11B 33/123 361/679.4 |
| 2009/0129009 A1* | 5/2009 | Zhang | ................... | G11B 33/12 361/679.34 |
| 2009/0279244 A1* | 11/2009 | Crippen | ................ | G06F 1/187 361/679.33 |
| 2010/0187957 A1* | 7/2010 | Liang | ..................... | G06F 1/187 312/223.2 |
| 2010/0309621 A1* | 12/2010 | Chang | .................... | G06F 1/187 361/679.39 |
| 2010/0321879 A1* | 12/2010 | Peng | .................... | G06F 1/187 361/679.33 |
| 2013/0314868 A1* | 11/2013 | Tsai | ..................... | G11B 33/124 361/679.33 |
| 2016/0124471 A1* | 5/2016 | Wang | .................. | H05K 7/1417 361/679.33 |
| 2019/0166714 A1* | 5/2019 | Choyikkunnil | ........ | H05K 7/183 |
| 2019/0174642 A1* | 6/2019 | Choyikkunnil | ...... | H05K 5/0217 |

* cited by examiner

STORAGE DEVICE CARRIER AND RELATED SYSTEMS AND METHODS

The disclosure herein relates to storage device systems, and in particular, relates to a carrier that may be used to capture a storage device without additional tools and to securely mount the storage device in an enclosure.

SUMMARY

Various aspects of the present disclosure relate to a carrier having a rail, a cap member, and a handle with a cam portion for capturing a storage device without additional tools and for securing the storage device in an enclosure.

In one aspect of the present disclosure, an apparatus includes a first rail and a second rail configured to secure a storage device. The first and second rails extend between a front end and a back end. The first rail defines a first side, and the second rail defines a side opposite to the first side. The apparatus also includes a cap member connected to the first rail and releasably connected to the second rail adjacent to the front end. The apparatus further includes a handle including a cam portion and a latch portion. The cam portion is rotatably connected to the cap member adjacent to the first side. The latch portion is releasably connected to at least one of the cap member adjacent to the second side and the second rail adjacent to the front end.

In another aspect of the present disclosure, a system includes a receiving frame having a sidewall defining a locking member. The locking member defines a front surface and a back surface. The system also includes a carrier configured to capture a storage device. The carrier is further configured to be slidably received by the receiving frame in a mounting direction. The carrier includes a first rail defining a first side and a second rail defining a second side opposite to the first side. The first and second rails extend in the mounting direction. A cap member extends orthogonal to the mounting direction. The cap member is connected to the first rail and releasably connected to the second rail adjacent to the front end. The system further includes a handle having a cam portion and a latch portion. The cam portion is rotatably connected to the cap member adjacent to the first side. The latch portion is releasably connected to at least one of the cap member adjacent to the second side and the second rail adjacent to the front end. The cam portion includes a first cam and a second cam. The first cam is configured to engage the back surface when the carrier is mounted to the receiving frame. The second cam is configured to engage the front surface to unmount the carrier from the receiving frame.

In another aspect of the present disclosure, a method includes disposing a storage device in a carrier. The carrier has a first rail defining a first side, a second rail spaced apart from the first rail and defining a second side, a cross member connected to the first and second rails adjacent to a back end, a cap member spaced apart from the cross member and releasably connected to the second rail adjacent to a front end, and a handle rotatably connected to the cap member adjacent to the first side and releasably connected to at least one of the cap member adjacent to the second side and the second rail adjacent to the front end. The method also includes mating a post on the first rail and a post on the second rail with corresponding recesses in the storage device. The method further includes connecting the cap member to the second rail to secure the storage device between the first and second rails.

It is to be understood that both the foregoing general description and the following detailed description present embodiments of the subject matter of the present disclosure, and are intended to provide an overview or framework for understanding the nature and character of the subject matter of the present disclosure as it is claimed.

BRIEF DESCRIPTION OF THE DRAWINGS

The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

Figure 1:
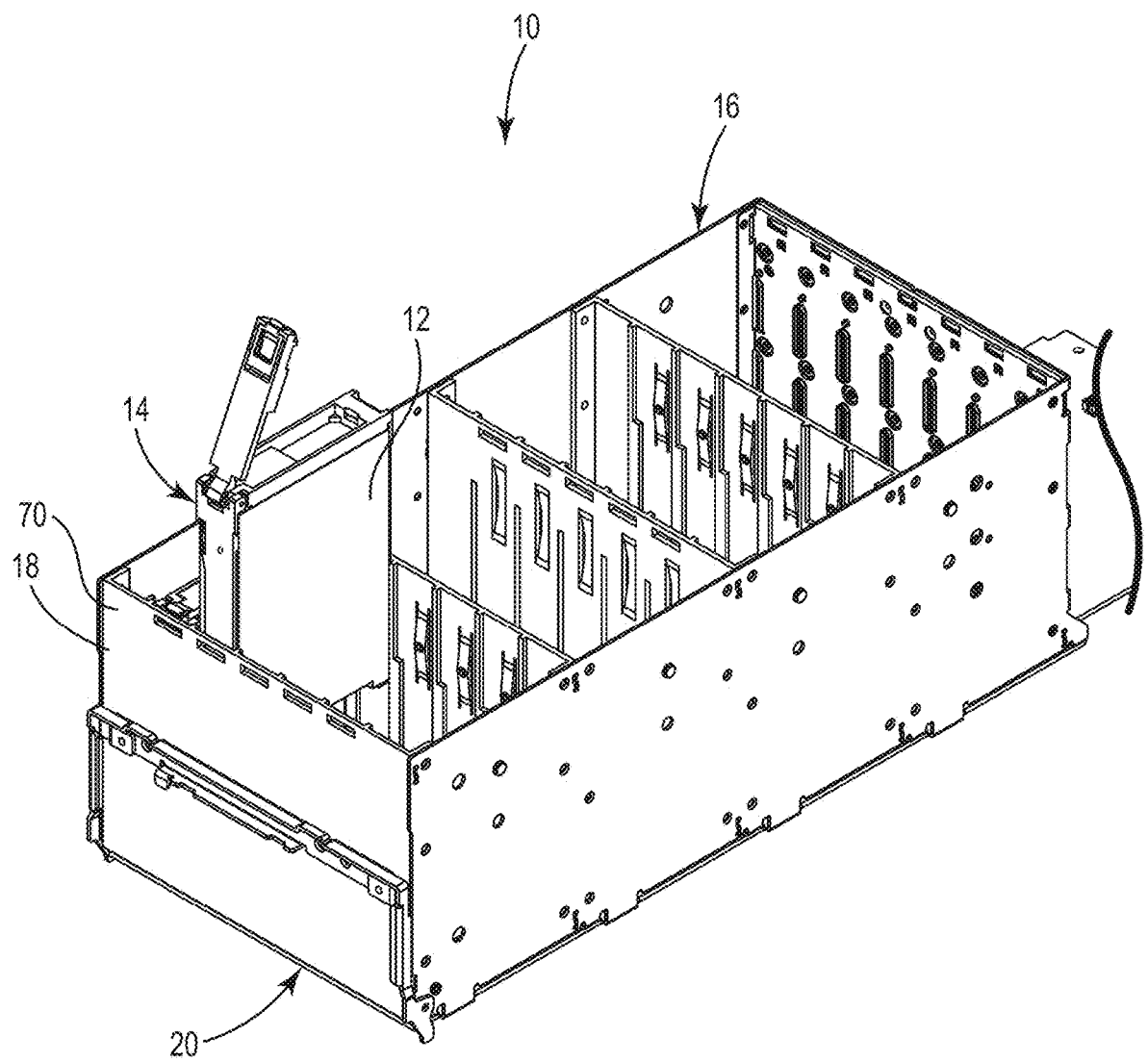
FIG. 1 is a perspective view of an enclosure system including a receiving frame and a storage device captured by a carrier, according to the present disclosure.

The disclosure may be more completely understood in consideration of the following detailed description of various embodiments of the disclosure in connection with the accompanying drawings.

DETAILED DESCRIPTION

In the following detailed description, reference is made to several specific embodiments. It is to be understood that other embodiments are contemplated and may be made without departing from the scope or spirit of the present disclosure. The following detailed description, therefore, is not to be taken in a limiting sense.

The present disclosure relates to storage devices. Storage devices are often described as information-storage devices, which may be considered a type of memory for computing. In general, a storage device is capable of storing information in various media formats, such as a bit stored in a magnetic format, an electronic format, or a combination of multiple formats. Non-limiting examples of storage devices include hard disc drives (HDD), solid-state drives (SSD), and hybrid drives including both types, although other formats are also contemplated.

Some storage devices are utilized in an array, which may be connected to a storage area network or other computing system that provides an information technology service. In such cases, storage devices may be mounted within an enclosure, such as a rack enclosure, or otherwise mounted to a larger structure during use. Such an enclosure may include a circuit board, such as a midplane or baseplane, that electrically, optically, or otherwise operably connects to the storage device, for example, to transfer of information and power.

Securely mounting each storage device to such an enclosure is often desirable to mitigate issues of a mechanical nature that may arise from rotational vibration, shock, and other vibrations. Such an enclosure may further contain a circuit board to which the storage device is engaged and operably connected to send and receive information during use.

Storage devices can be defined by standards that specify or control the geometry of the storage device. For example, the small form factor (SFF) definition controls the mounting hole locations, connector location, and maximum dimensions for base casting. Except for this geometry, the other exterior features and dimensions of an SFF storage device may be uniquely configured, such as the height of the storage device. It is often desirable to be able to mount more than one configuration of storage device in the same type of enclosures.

A carrier can be used to capture the unique geometry of a storage device to facilitate mounting to a particular type of enclosure. When captured by a carrier, the storage device may then be securely mounted to the enclosure via the carrier and operably connected to the circuit board of the enclosure. However, some carriers are not compatible with all storage device geometries, even if the storage devices are defined by the same standard. As such, manufacturing a different type of carrier may be required for each storage device geometry.

Carriers can also facilitate the mounting and unmounting of storage devices within the rack enclosure, which may be helpful for swapping storage devices, troubleshooting storage devices, or reconfiguring a rack enclosure. Some carrier designs require the use of tools (e.g., screwdrivers) to securely capture a storage device. When capturing several storage devices for each enclosure, such carrier designs requiring tools may significantly impact the time needed for installing storage devices in an enclosure, which may be undesirable, for example, if extending the "down time" of a storage area network.

It would be desirable to facilitate the mounting and unmounting of a storage device with an enclosure without time-consuming tools, to facilitate the ease of manufacturing different carrier designs, and to facilitate capturing various storage device geometries defined by a standard with one carrier design.

The present disclosure provides a carrier that may be used to capture a storage device without additional tools, may be used to securely mount storage device in an enclosure, and may be compatible with multiple storage device geometries defined by a standard. Various components of the carrier may be integrally formed to facilitate the ease of manufacturing. The carrier has a rail, a cap member, and a handle with a cam portion. The rail can include a post that mates with a recess in the storage device. The cap member can hinge to one of the rails and be rotated into a closed position to securely capture the storage device without additional tools. The captured storage device may be guided into the enclosure by a user grabbing the handle. The handle may hinge to one of the rails and be rotated into a locked position to securely mount the captured storage device in the enclosure and optionally connect the carrier to a circuit board of the enclosure. Various features of the rail may be used to help align the captured storage device with the enclosure during mounting. Various features may also relieve pressure on a circuit board in the enclosure when the captured storage device carrier is mounted.

The following terms used throughout the present disclosure are defined as follows, unless the context of the disclosure dictates otherwise:

As used herein, "capture" means to attach to a device for purposes of mechanical mounting to another structure. For example, a storage device may be captured by attaching a carrier to it. The carrier may be used to mount the storage device to an enclosure.

As used herein, "mount" means to attach to a structure for operational use. For example, a storage device may be mounted to an enclosure by attaching the storage device to a receiving frame of the enclosure and optionally connecting the storage device to a circuit board of the enclosure such that the storage device is installed in the enclosure.

As used herein, "secure" means to restrict the movement of a component relative to another component suitably for a particular application. For example, a carrier may secure the storage device by disposing the storage device between two rails, a cross member, and a cap member of the carrier to restrict movement of the storage device relative to the carrier for purposes of mechanical mounting to an enclosure.

As used herein, "engage" means to interface, touch, or directly contact to accomplish a particular task. For example, a cam portion may engage a receiving frame of an enclosure by directly contacting a surface of the receiving frame to slide along the surface or to apply a force to the surface.

As used herein, "hinge" means to pivotally or rotatably connect to a structure about a joint structure. For example, two components may be hinged by a slot and pin or a web of material that allows the structures to pivot or rotate relative to one another about the joint structure. In some cases, the components may pivot or rotate about a point, an axis, a restricted area (e.g., pin restricted by an elongate slot), or a restricted volume (e.g., ball in a joint space).

As used herein, "pivotally connected" and "rotatably connected" are used synonymously with "hinged."

The terms "coupled" or "connected" refer to elements being attached to each other either directly (in direct contact with each other) or indirectly (having one or more elements between and attaching the two elements).

Terms related to orientation, such as "top", "bottom", "side", and "end", are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference will now be made to the drawings, which depict one or more aspects described in this disclosure. However, it will be understood that other aspects not depicted in the drawings fall within the scope and spirit of this disclosure. Like numbers used in the figures refer to like components, steps and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

FIG. 1 shows an enclosure system 10 according to one or more embodiments. As illustrated, the enclosure system 10 includes a storage device 12 captured in a carrier 14 in the process of mounting or unmounting to an enclosure 16 having a receiving frame 18 and a circuit board 20. Although not shown, the enclosure 16 may include a shroud to cover the receiving frame 18 and any mounted storage devices 12.

The storage device 12 may take any suitable shape. In some embodiments, the storage device 12 has a generally rectangular prism or box-like shape. In the illustrated embodiment, the height of the storage device is the longest dimension (or third shortest), the width is the second longest dimension (or second shortest), and the height is the third longest dimension (or shortest).

The enclosure 16 may be configured to receive one or more storage devices 12. In some embodiments, the enclosure 16 defines one or more arrays of storage devices 12 (e.g., multiple rows). As illustrated, only one storage device 12 is shown for illustrative purposes. In some embodiments, the enclosure 16 includes more than one slot defined by the receiving frame 18 and connections on the circuit board 20. Each slot may be configured to receive a storage device 12.

The storage devices 12 may be arranged in any suitable manner. In some embodiments, the storage devices 12 are in a "tombstone" arrangement, in which the storage devices are inserted length-wise into the receiving frame 18. The storage devices 12 may be stacked height-wise into rows. Each row of storage devices 12 may be as wide as the storage devices therein. The rows of storage devices 12 may be stacked.

Each storage device 12 may be mounted adjacent to one or more sidewalls 70 of the receiving frame 18. The sidewall 70 may be engaged by the carrier 14 to secure the captured storage device 12 to the enclosure 16. One or more sidewalls 70 may also separate the rows of storage devices 12 within the enclosure 16.

The carrier 14 is configured to capture the storage device 12. When securely captured, the storage device 12 may be at least partially disposed within the carrier 14. In some embodiments, the carrier 14 engages two sides of the storage device 12. In one or more embodiments, the carrier 14 engages more than two sides of the storage device 12. In the illustrated embodiment, the carrier 14 engages four sides of the storage device 12. For example, the carrier 14 can engage a perimeter of the storage device 12.

The carrier 14 may not engage all sides of the storage device 12. In some embodiments, the carrier 14 does not engage one side of the storage device 12. In one or more embodiments, the carrier 14 does not engage two sides of the storage device 12. The "free" sides of the storage device 12 may not be defined by a standard (e.g., SFF), which may allow the carrier 14 to be compatible for capturing multiple types of storage devices defined by the standard (e.g., multiple storage device heights).

Once captured, a user may insert, lower, or at least partially dispose the captured storage device 12 within the receiving frame 18 until the storage device is mounted to the enclosure 16. In one or more embodiments, the carrier 14 is configured to allow the user to control the mounting process by handling the carrier instead of directly handling the storage device 12.

After being lowered, a user may secure the storage device 12 to the receiving frame 18 to complete the mounting process. In one or more embodiments, the carrier 14 is configured to allow the user to lock the storage device 12 to the receiving frame 18 by manipulating the carrier instead of the storage device 12.

Securing the storage device 12 to the receiving frame 18 may also to establish a connection to the circuit board 20. In one or more embodiments, the storage device 12 is operably connected to the circuit board 20 when mounted, for example, to transfer data or power. Such a connection may be electrical, optical, electromagnetic, or any other suitable type of connection.

The storage device 12 can be unmounted from the enclosure 16. In one or more embodiments, a user may manipulate the carrier 14 to release the carrier from the receiving frame 18. Releasing may also disconnect the storage device 12 from the circuit board 20. Once released, the user may remove, raise, or at least partially remove the storage device 12 from the receiving frame 18 until the storage device is unmounted.

Referring now to FIGS. 2-8, the carrier 14 is shown in further detail. The carrier 14 can be manipulated, or moved, into various positions that can facilitate capturing and mounting processes of the storage device 12.

The carrier 14 can include a first rail 22, a second rail 24, a cross member 26 connecting the first and second rails, a cap member 28 connected to the first rail, and a handle 30 connected to the first rail. The carrier 14 can move between a closed position (see FIG. 2) that can capture the storage device 12 and an open position (see FIGS. 3-4) that can receive or release the storage device 12. Also, the carrier 14 can move between a locked position (see FIGS. 5, 7) that can secure the carrier to the receiving frame 18 and an unlocked position (see FIGS. 2, 6) that allows the carrier 14 to slide into or out of the receiving frame 18.

The first rail 22 and the second rail 24 are configured to secure the storage device 12. The second rail 24 may be spaced apart from the first rail 22. The storage device 12 may be captured between the first and second rails 22, 24.

In some embodiments, the rails 22, 24 and the cross member form a "U"-shaped component. The cap member 28 can connect the ends of the "U"-shape to form an O-shape, or perimeter, around the storage device 12 being captured.

The first and second rails 22, 24 can take any suitable shape. In one or more embodiments, the rails 22, 24 may be elongate in shape and may extend in a mounting direction. For example, the first and second rails 22, 24 may extend between a front end 90 and a back end 92 of the carrier 14.

The rails 22, 24 may be formed of any suitable material for supporting the storage device 12 within the carrier 14. In some embodiments, the rail 22, 24 are flexible. However, in some embodiments, the rails 22, 24 are substantially rigid. In one or more embodiments, the rails 22, 24 are formed of a plastic, such as an injection molded plastic. In one or more embodiments the rails 22, 24 are formed of a metal, such as aluminum or steel.

During the mounting process, the rails 22, 24 may help to guide the storage device 12. When mounted, the rails 22, 24 may also help to secure the carrier 14. In some embodiments, the rails 22, 24 include one or more recesses 48 (see FIG. 4), which may be engaged to restrict movement of the carrier 14 after being mounted. In one or more embodiments, the recesses 48 are apertures that extend through the rails 22, 24. In the illustrated embodiment, each rail 22, 24 includes two recesses 48.

In the illustrated embodiment, the cross member 26 connects the first rail 22 and the second rail 24 adjacent to the back end 92 of the carrier 14. In some embodiments, the cross member 26 is non-hingedly (e.g., non-pivotally) connected to the rails 22, 24. In one or more embodiments, the cross member 26 extends orthogonal to the rails 22, 24, which may also be orthogonal to the mounting direction when the carrier 14 (see FIG. 2).

Any suitable material may be used to form the cross member 26, which can support the connection between the rails 22, 24. In some embodiments, the cross member 26 is formed of the same material as the rails 22, 24. In one or more embodiments, the cross member 26 is integrally formed with rails 22, 24.

The cross member 26 can take any suitable shape. In some embodiments, the cross member 26 may be elongate in shape and extend linearly from the first rail 22 to the second rail 24. In one or more embodiments, the cross member 26 defines a narrow portion 44 (see FIG. 4) that provides a space for a connector of the captured storage device 12 to make a connection (e.g., with a connector of the circuit board 20 shown in FIG. 1). The space may be wide enough to accommodate various locations and sizes of connections within the standard.

The cross member 26 can be more flexible (e.g., less rigid) than the rails 22, 24. In some embodiments, the narrow portion 44 is a portion of material extending at least partially between the rails 22, 24 that is narrower in height than the rails. The cross member 26 may also include one or more portions that are the same height as the rails 22, 24.

When the carrier 14 is open (see FIGS. 3-4), the first and second rails 22, 24 can be urged, or deflected, away from one another in the capturing process of the storage device 12. The first and second rails 22, 24 may remain connected by the cross member 26, which can flex into a non-linear shape to allow an increased distance between the rails. In some embodiments, the front end 90 of the rails 22, 24 can be urged farther apart than the back end 92 of the rails.

The rails 22, 24 may be urged apart a sufficient distance to provide sufficient clearance to allow the storage device 12 to be received between the rails and to be disposed adjacent to the cross member 26. For example, the rails 22, 24 may be urged apart sufficiently for one or more posts 46 to clear opposing sides of the storage device 12 during the capturing process.

Posts 46 can be disposed on the first and second rails 22, 24 and may be used for mating with corresponding recesses in the storage device 12. The posts 46 may extend in an inward direction from the rails 22, 24 of the carrier 14. In some embodiments, both rails 22, 24 include at least one post 46. In the illustrated embodiment, each rail 22, 24, includes two posts 46. The storage device 12 may include one or more corresponding recesses. The rails 22, 24 may have the same or less number of posts 46 than the corresponding recesses in the storage device 12.

The cap member 28 can connect the first rail 22 and the second rail 24 adjacent to the front end 90 of the carrier 14. In some embodiments, the cap member 28 is hinged (e.g., pivotally connected) to the first rail 22 at the front end 90. In some embodiments, the cap member 28 is releasably connected to the second rail 24 adjacent to the front end 90.

Figure 2:
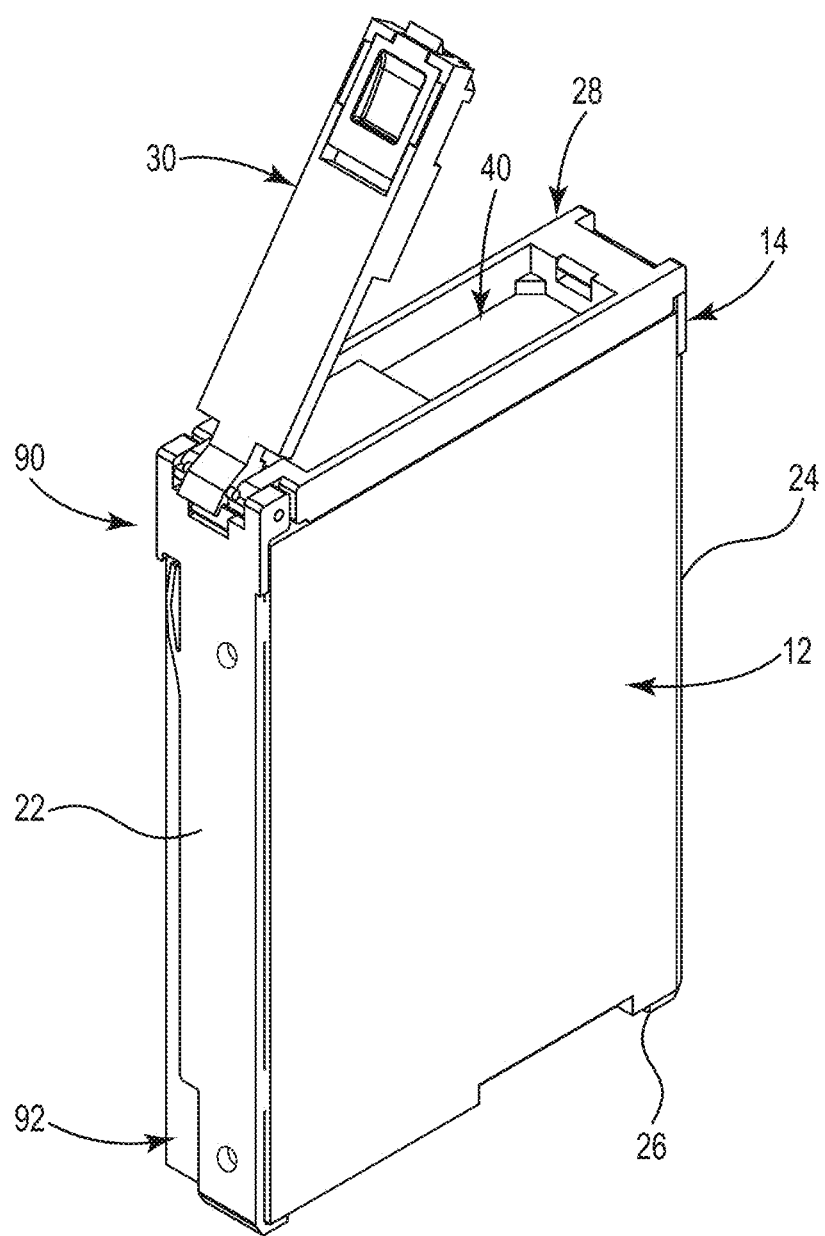
FIG. 2 is a perspective view of the storage device captured by the carrier of FIG. 1 in a closed position.
Figure 3:
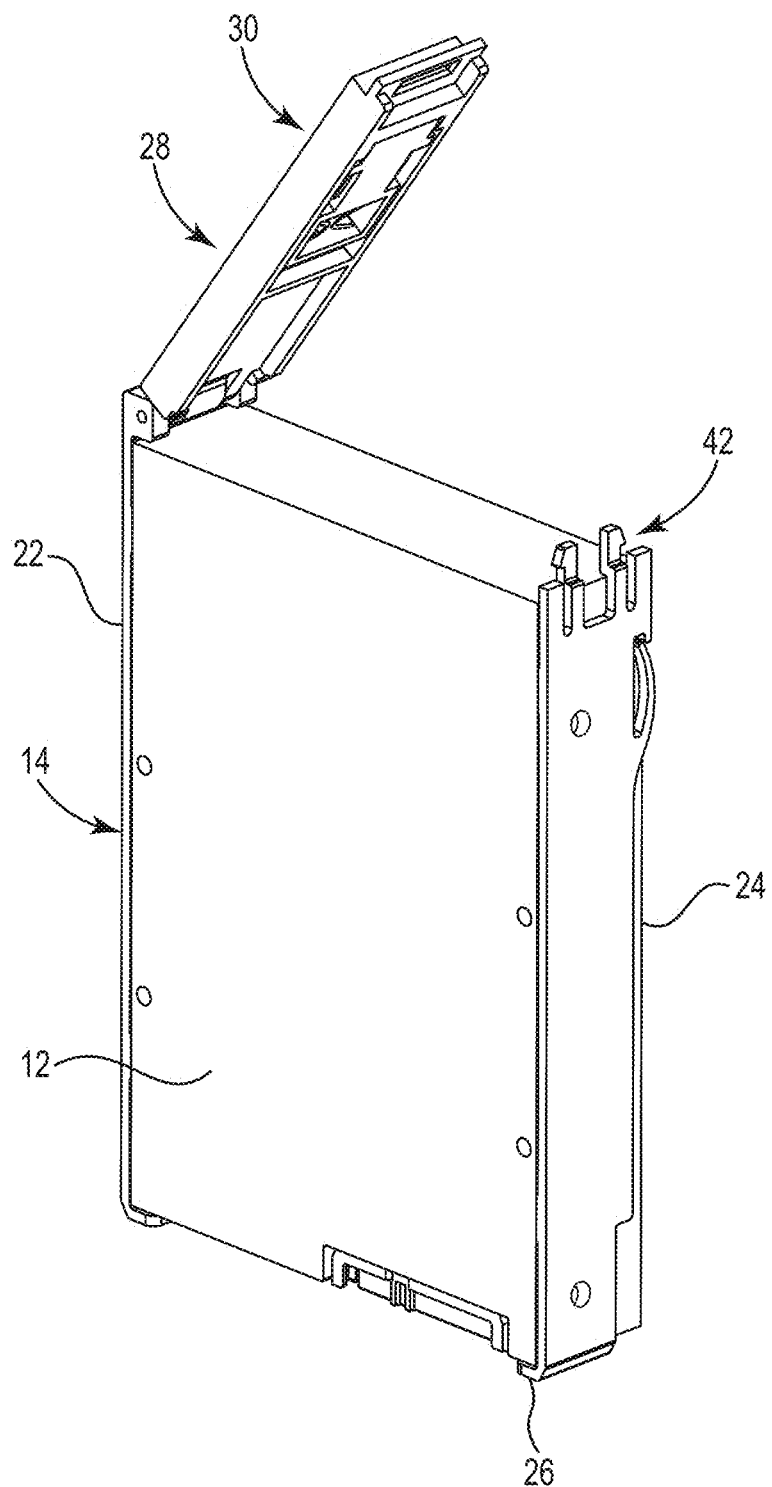
FIG. 3 is a perspective view of the storage device and the carrier of FIG. 2 in an open position.

In one or more embodiments, the cap member 28 extends orthogonal to the rails 22, 24, which may also be orthogonal to the mounting direction when the carrier 14 is closed (see FIG. 2). The cap member 28 can extend at a range of angles from the first rail 22 when the carrier 14 is open (see FIGS. 3-4).

Any suitable connection can be used to hinge the cap member 28 and the first rail 22. In some embodiments, a pin 60 is used for hinging the cap member 28 and the first rail 22 about an axis.

The storage device 12 can be secured between the cross member 26 and the cap member 28 of the carrier 14 when closed. In some embodiments, the distance between the cross and cap members 26, 28 may be about equal to the length of the storage device 12.

The cap member 28 can take any suitable shape. In some embodiments, the cap member 28 is elongate in shape and extends from the first rail 22 to the second rail 24 when closed. In some embodiments, the cap member 28 defines a recess 40 (see FIG. 2) that provides a space for receiving the handle 30. For example, the handle 30 may be at least partially disposed within, or nested, the recess 40 of the cap member 28 when in the locked position (see FIG. 4). The nesting may reduce the overall height of the captured storage device 12. In one or more embodiments, the recess 40 at least partially forms an aperture through the cap member 28.

In some embodiments, the cap member 28 may be rotated until the cap member 28 is connected to the second rail 24 to secure the storage device 12 between the first and second rails 22, 24. The cap member 28 may engage a side of the storage device 12 when the carrier 14 is closed.

Any suitable connection 42 can be used to releasably connect the cap member 28 to the second rail 24 that can maintain the carrier 14 in the closed position while capturing the storage device 14. In some embodiments, the connection 42 is a snap-fit connection, or clip, attaching the cap member 28 to the second rail 24. The connection 42 may be disposed adjacent to the front end 90 of the second rail 24.

As illustrated, the connection 42 is a snap-fit connection and can include a portion on the second rail 24 and a portion on the cap member 28. In some embodiments, the connection 42 includes an elongate prong extending from the second rail 24 that can extend through an aperture in the cap member 28. In some embodiments, a protrusion extends orthogonally from the elongate prong that can retain the cap member 28 relative to the second rail 24. In one or more embodiments, the connection 42 includes two elongate prongs and two protrusions extending in opposite directions and orthogonally from one of the elongate prongs.

As illustrated, the orientation of the protrusions may eliminate slop between the cap member 28 and the second rail 24 when connected and may also allow a pinching motion to release the connection 42. In one or more embodiments, the connection 42 is retained under compression and/or tension to keep the cap member 28 closed.

By closing the cap member 28 and securing the cap member 28 with the connection 42 to the second rail 24, the storage device 12 can be captured in one movement. For example, rotating the cap member 28 to the closed position may capture the storage device 12 positioned between the rails 22, 24. The storage device 12 is restricted in movement laterally by the rails 22, 24, front-to-back by the cross and cap members 26, 28, and up-and-down by the posts 46.

The handle 30 can be hinged to the first rail 22 adjacent to the front end 90 of the carrier 14. In some embodiments, the handle 30 is also hinged to the cap member 28. In one or more embodiments, the handle 30 is hinged to the cap member 28 at a cam portion 32 of the handle. In some embodiments, the handle 30 is also releasably connected to the cap member 28. In one or more embodiments, the handle 30 is releasably connected to the cap member 28 at a latch portion 34 of the handle. The latch portion 34 may be disposed on an opposite end of the handle 30 than the cam portion 32.

Any suitable connection can be used to hinge the handle the handle 30 to the first rail 22 or the cap member 28. In some embodiments, the pin 60 is used for hinging the handle 30 and the first rail 22 about an axis. In or more embodiments, the same pin 60 is used for hinging the handle 30, the first rail 22, and the cap member 28 about the same axis.

The handle 30 can take any suitable shape. In some embodiments, the handle 30 may have an elongate shape that, in the locked position, extends from the cam portion 32, which extends beyond the first rail 22, and the latch portion 34, which extends short of the second rail 24 and the end of the cap member 28. In some embodiments, the handle 30 may be narrower in height than the cap member 28 so that the handle 30 may be at least partially received within the recess 40 of the cap member 28 in the locked position (e.g., between elongate rails of the cap member 28). In one or more embodiments, the handle 30 does not engage any side of the storage device 12 in the locked position or the unlocked position.

Figure 5:
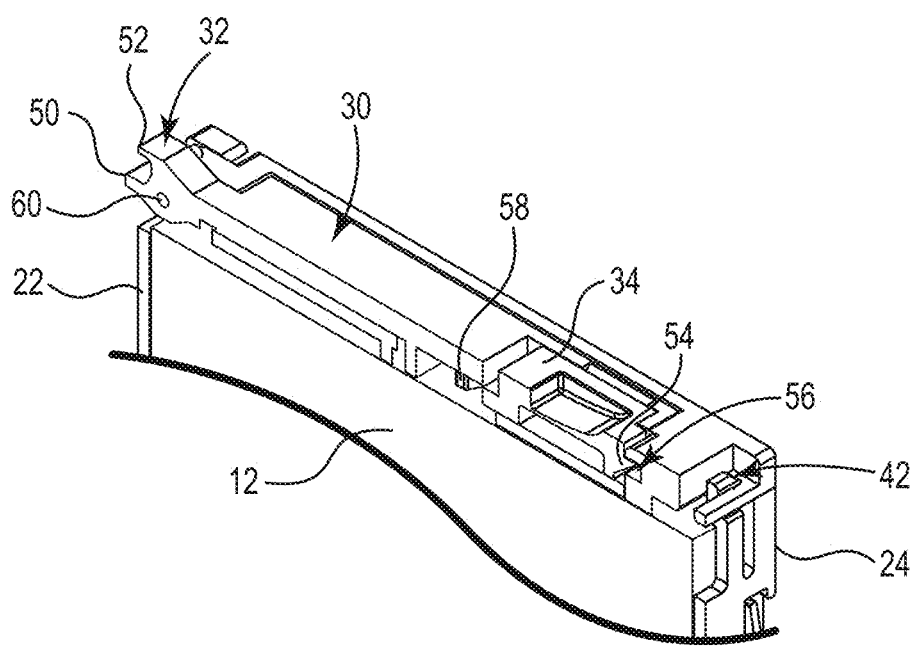
FIG. 5 is a partial, perspective view of a cap and a handle of the carrier of FIG. 1.

The latch portion 34 can secure the handle 30 to the cap member 28 in the locked position (see FIG. 5). In some embodiments, the latch portion 34 includes a protrusion 54 that can mate with a recess 56 formed in the cap member 28 to releasably connect the latch portion 34 to the cap member 28. A force may be applied to the protrusion 54 by a spring member 58, or other resiliently deformable element, that biases the protrusion 54 into the recess 56 in the absence of user intervention. A user may release the latch portion 34 by counteracting the force of the spring member 58 to remove the protrusion 54 from the recess 56. When the latch portion 34 is released, the handle 30 is unlocked and can rotate about the hinge to the cap member 28 (see FIG. 2).

The handle 30 can be hinged to the first rail 22 at the cam portion 32 of the handle (see FIG. 5). The cam portion 32 may also be hinged to the cap member 28 by the pin 60.

The cam portion 32 can include one or more cams 50, 52. In some embodiments, the cam portion 32 includes a first cam 50 and a second cam 52 that form a jaw structure that can engage a locking member 72 defined by the receiving sidewall 70 of the receiving frame 18. The cams 50, 52 may oppose one another across a space to form the jaw structure. Both cams 50, 52 may rotate together around the pin 60.

Figure 6:
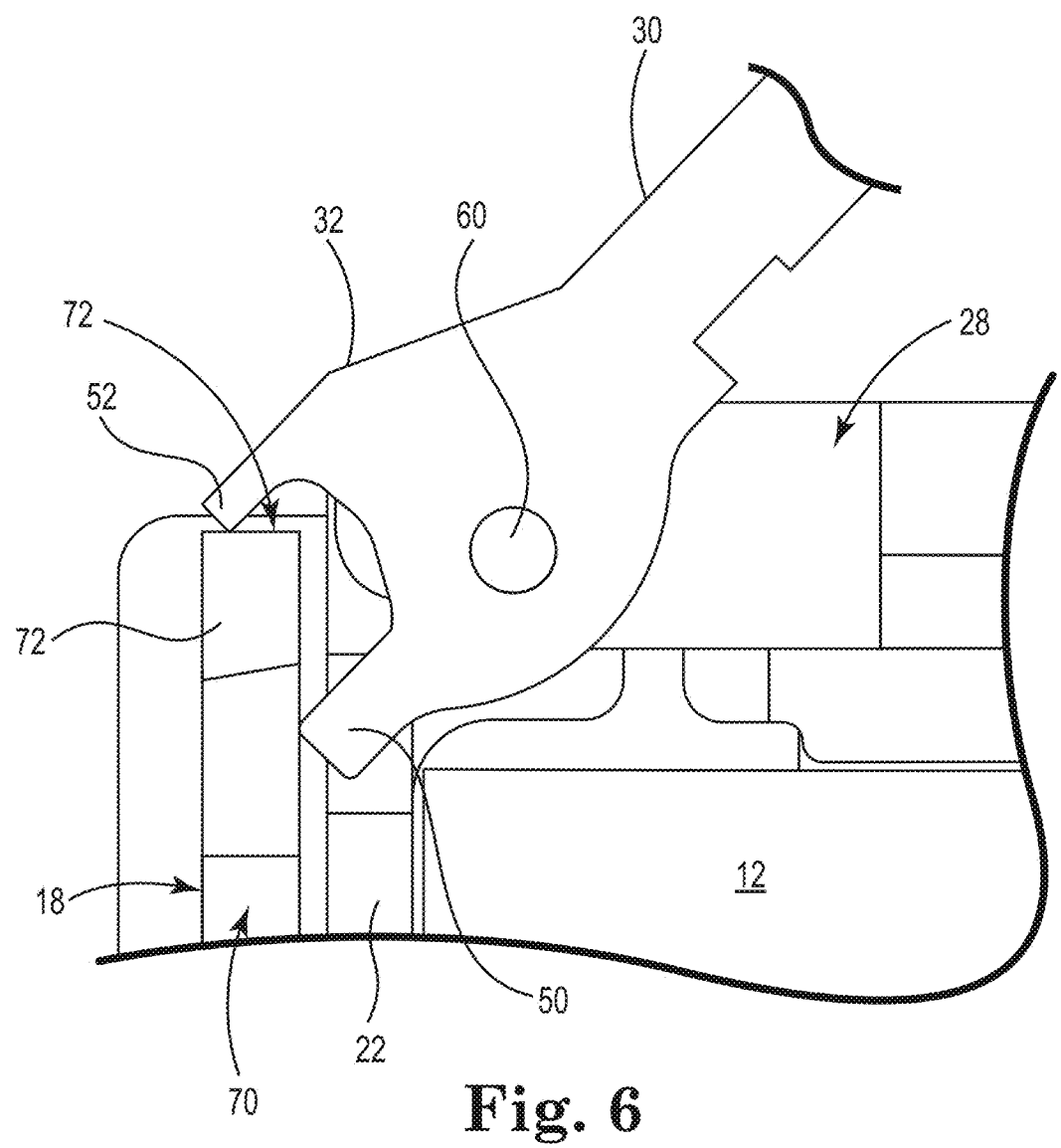
FIG. 6 is a partial, cross-sectional view of the enclosure system of FIG. 1 with the carrier in an unlocked position and ready for mounting in the receiving frame.
Figure 7:
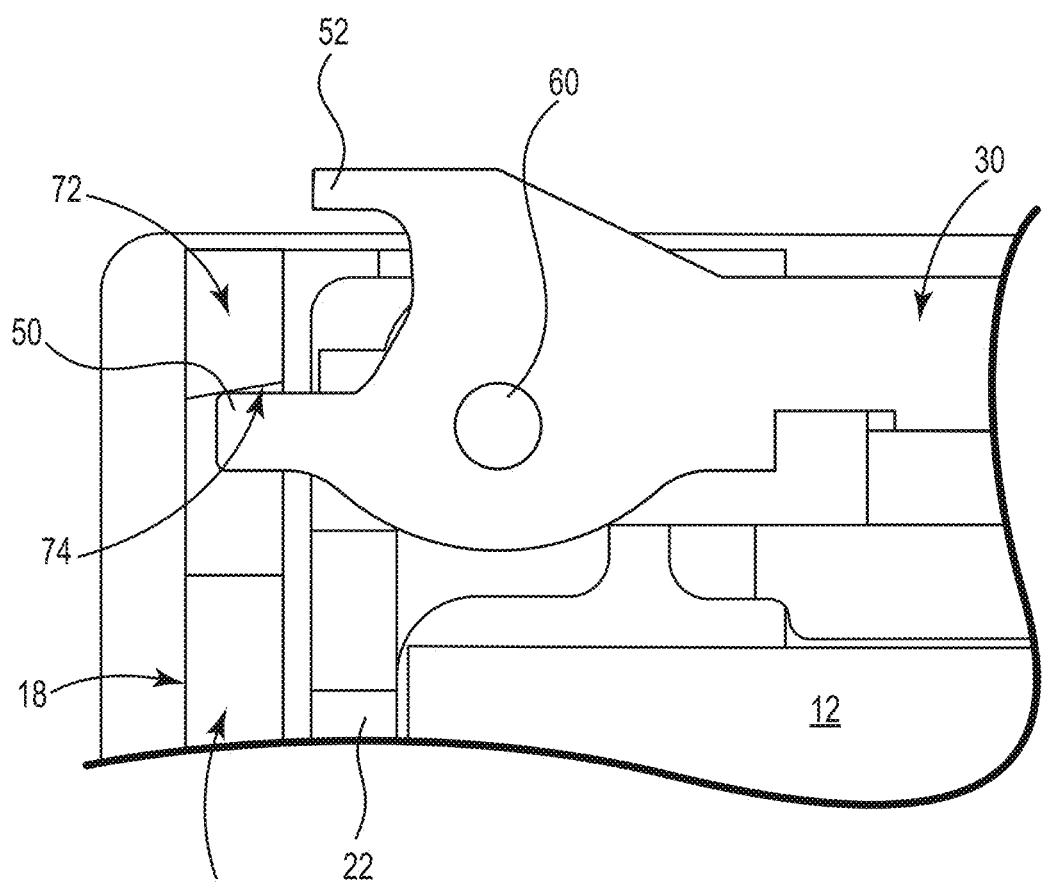
FIG. 7 is a partial, cross-sectional view of the enclosure system of FIG. 1 with the carrier in a locked position and mounted to the receiving frame.

In some embodiments, the first cam 50 can engage a back surface 74 of the locking member 72 when the carrier 14 is mounted (see FIG. 7). In some embodiments, the second cam 52 can engage a front surface 76 of the locking member 72 when the handle 30 is unlocked to unmount the carrier 14 or to guide the engagement of the carrier 14 during the mounting process (see FIG. 6).

The handle 30 can extend orthogonal to the rails 22, 24, which may also be orthogonal to the mounting direction, when the carrier 14 is locked (see FIGS. 5, 7). When the carrier is unlocked, the handle 30 can extend at a range of angles from the first rail 22 (see FIGS. 2, 6).

In some embodiments, the handle 30 extends at a non-orthogonal angle to the rails 22, 24 when the carrier 14 is unlocked (see FIGS. 2, 6). In one or more embodiments, the handle 30 also extends at a non-parallel angle to the rails 22, 24 when the carrier 14 is open.

Figure 8:
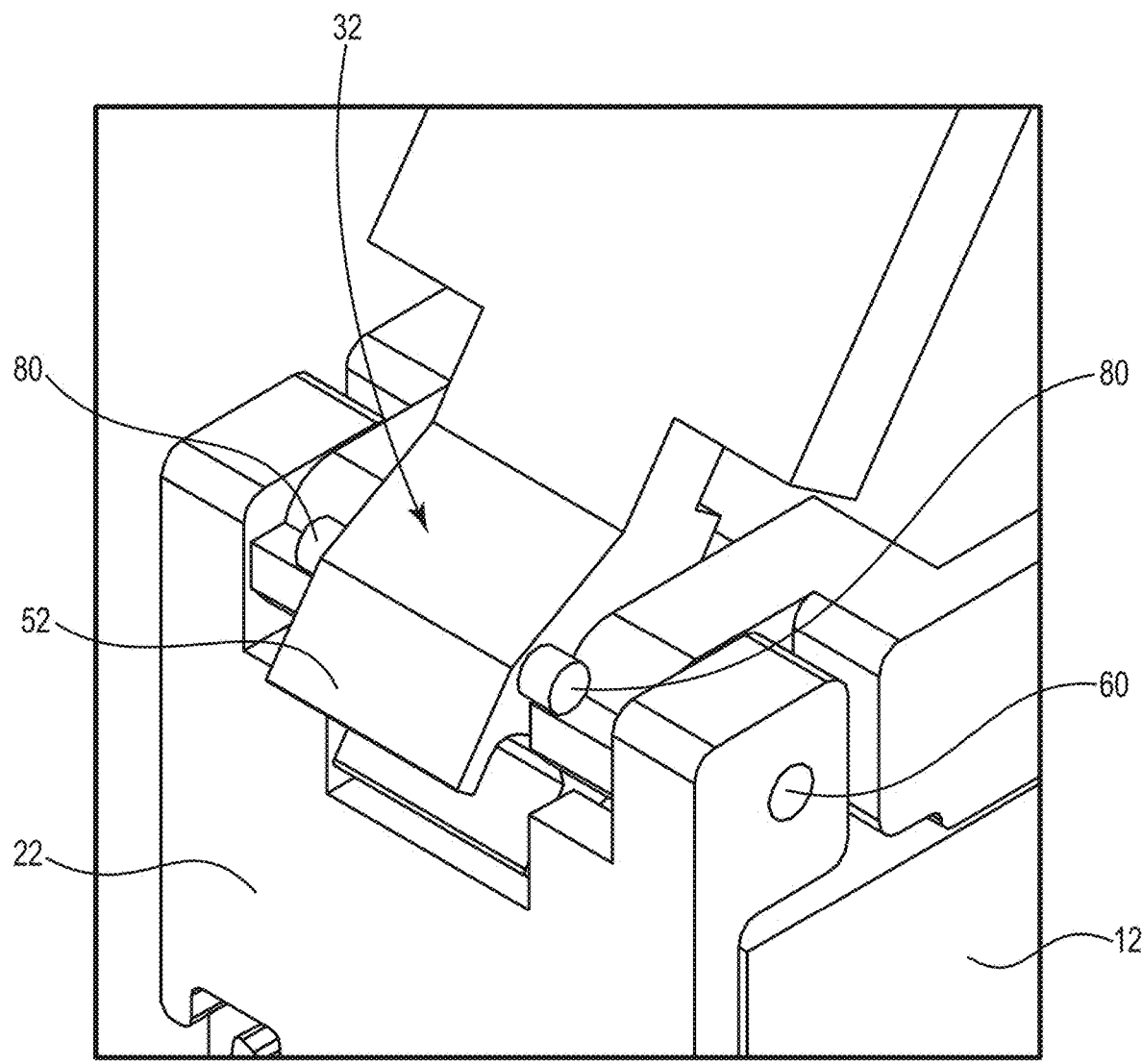
FIG. 8 is a partial, perspective view of the storage device captured by the carrier of FIG. 2 with the carrier in an unlocked position.

The rotation of the unlocked handle 30 can be limited by a stop 80 (see FIG. 8). In some embodiments, the stop 80 is a protrusion extending laterally from the second cam 52 of the cam portion 32. In some embodiments, the handle 30 includes two stops 80 extending in opposite directions from the cam portion 32 to evenly balance the forces on the cam portion. In one or more embodiments, the stop 80 can engage the cap member 28 (e.g., a tab of the cap member 28) in the closed position when the handle 30 is rotated to a fully unlocked position (see FIGS. 2, 7).

The stop 80 may position the first cam 50 in a fully unlocked position that is flush with or retreated within an exterior surface of the first rail 22 (see FIG. 6) that allows the cam first cam 50 to clear the front surface 76 of the locking member 72 (or the sidewall 70) during the mounting process. In the fully unlocked position, the second cam 52 may also be positioned to catch the front surface 76 of the locking member 72 after the first cam 50 slides past the locking member 72.

The cam portion 32 can be formed of any suitable material. In some embodiments, the cam portion 32 is formed of a resiliently deformable material that can flex. For example, the first cam 50 may be slightly deformed when the handle 30 is locked (see FIG. 7).

During the mounting process, once the position in FIG. 6 is achieved, the handle 30 may be rotated. In particular, a user may rotate the latch portion 34 toward the cap member 28. The fulcrum of the pin 60 may cause the second cam 52 to slide along the front surface 76 of the locking member 72 as the captured storage device 12 is lowered into the receiving frame 18 along the sidewall 70.

As the handle 30 rotates further, the first cam 50 may begin to engage the back surface 74 of the locking member 72. The second cam 52 may also disengage with the front surface 76 as the handle 30 rotates.

As rotation of the handle 30 continues, the first cam 50 may slide along the back surface 74 until the handle 30 reaches a locked position (see FIG. 7). The first cam 50 may the first cam 50 may be deformed, or loaded (e.g., compressed and/or tensioned), in the locked position, which can provide some resistance as the handle 30 approaches the locked position. Force from the deformed first cam 50 may urge the captured storage device 12 downward to further secure the captured device when mounted.

When the latch portion 34 is unlocked, force from the deformed first cam 50 may also lift the latch portion 34 away from the cap member 28. For example, the latch portion 34 may be lifted enough for the protrusion 54 to clear the recess 56, which may help a user to grab the handle 30 to extract the captured storage device 12 from the receiving frame 18.

The carrier 14 can include even more features to facilitate the mounting process. For example, during the mounting process, the captured storage device 12 can be connected to the circuit board 20 (see FIG. 1) by applying a force upon the storage device via the carrier 14 to engage a connection of the storage device with a connection of the circuit board.

Instead of applying the full extent of the force to the circuit board 20 (which may cause damage to the circuit board), the travel of the carrier 14 may be limited, which may at least partially relieve pressure on the circuit board when the captured storage device 12 is mounted. In some embodiments, the carrier 14 can include one or more shoulders 62 that can engage the sidewall 70 of the receiving frame 18 as the carrier 14 moves in the mounting direction. In one or more embodiments, one or more rails 22, 24 of carrier 14 includes the one or more shoulders 62.

Figure 9:
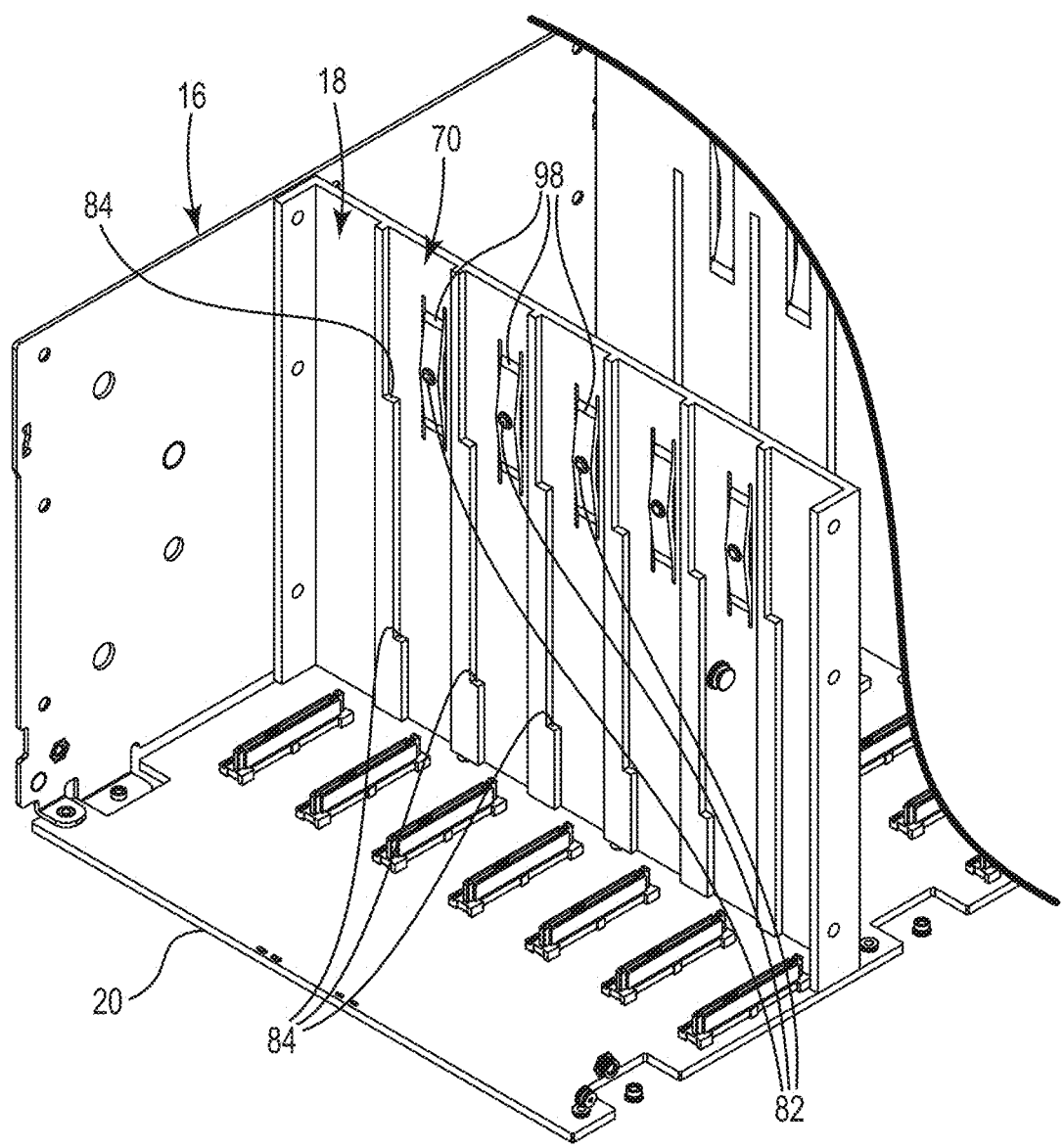
FIG. 9 is a perspective view of a sidewall of the receiving frame of FIG. 1.

Referring now also to FIG. 9, the sidewall 70 of the receiving frame 18 can include one or more shoulders 84 that can engage the one or more shoulders 62 of the carrier 14. In some embodiments, the second cam 52 of the carrier 14 engages the front surface 76 of the locking member 72 and sidewall 70 before the shoulders 62, 84 engage during the mounting process. In one or more embodiments, when the second cam 52 engages the front surface 76, the shoulders 62, 84 are spaced about 5 mm apart. For example, if the connectors on the storage device 12 and the circuit board 20 are about 2 mm long, then the connectors are stopped about 1 mm apart at their ends and about 5 mm from full engagement. As the handle 30 is rotated, the shoulders 62, 84 can restrict the downward travel of the captured storage device 12 and provide resistance to deform the first cam 50.

The sidewall 70 of the receiving frame 18 may also include one or more spring members 98 that can help to laterally align the carrier 14 when mounting. The spring members 98 may apply a force in a first direction that is orthogonal to the mounting direction. In some embodiments, the first direction is side-to-side relative to the storage device 12.

Figure 4:
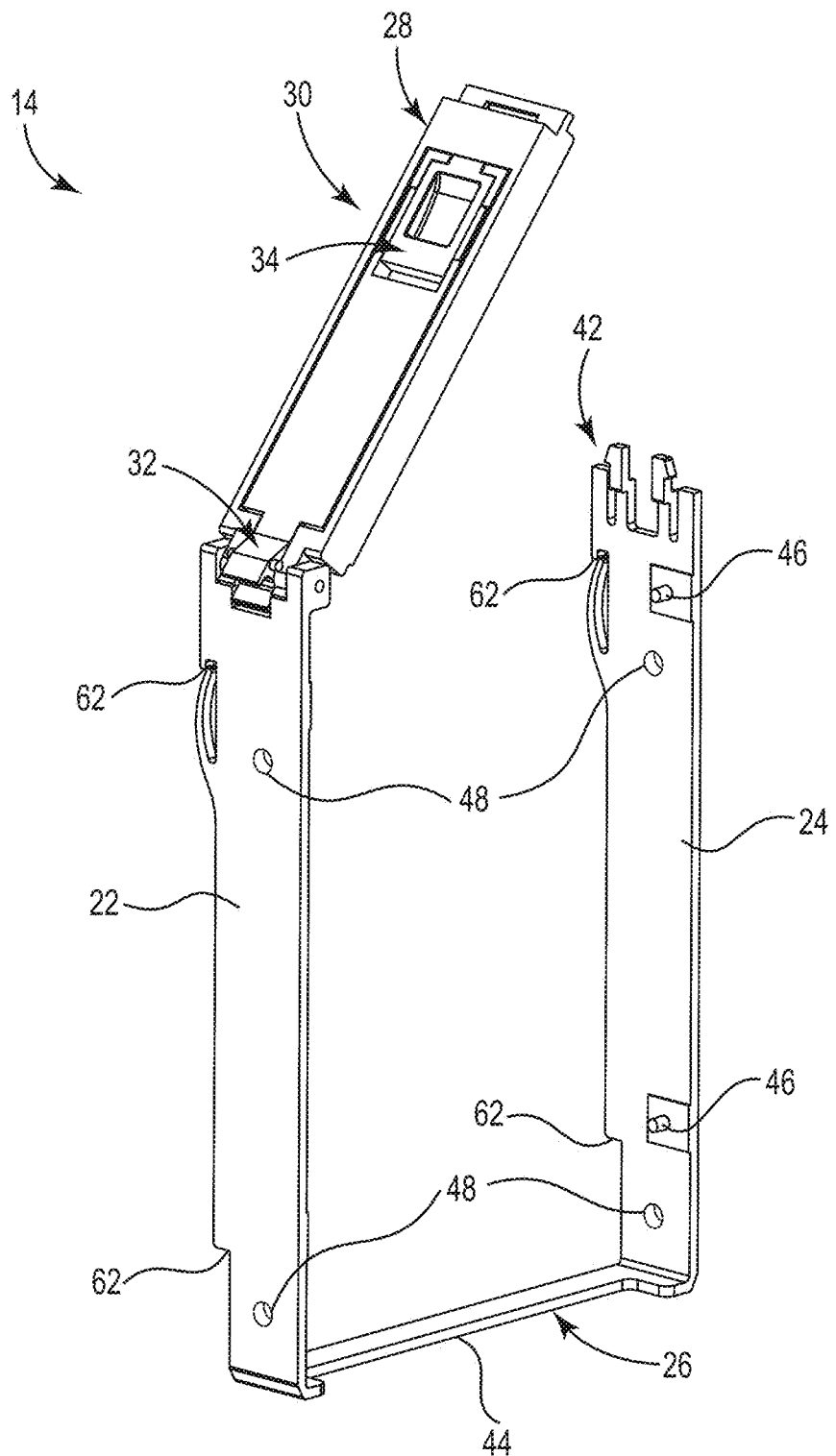
FIG. 4 is perspective view of the carrier of FIG. 2 without the storage device.

The spring members 98 may include one or more protrusions 82 extending from the spring members that can mate with corresponding recesses 48 in the rails 22, 24 of the carrier 14 (see FIG. 4). The protrusions 82 can help to securely mount the storage device 12, for example, by helping to prevent the storage device from sliding in and out of the receiving frame 18 when the handle 30 is locked.

Figure 10:
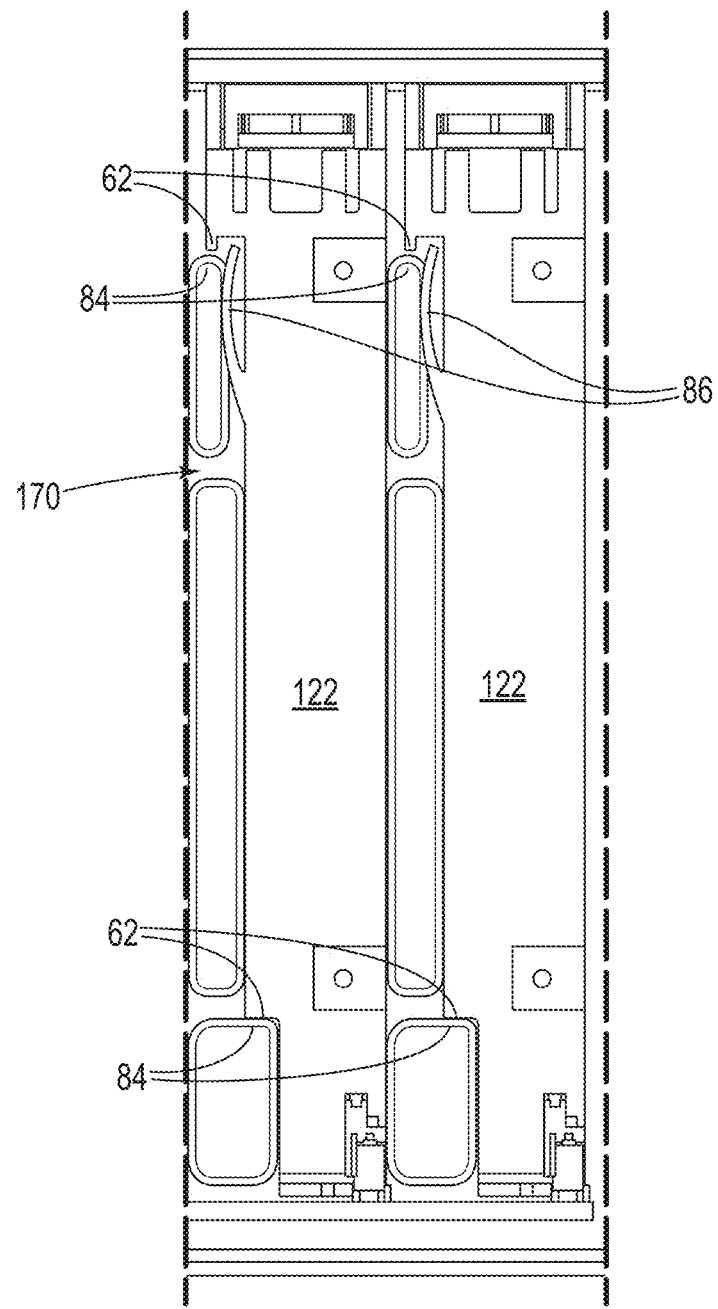
FIG. 10 is an elevation view of an alternative sidewall of the receiving frame of FIG. 1 and alternative rail of the carrier of FIG. 2.

Referring now to FIG. 10, an alternative sidewall 170 and an alternative first rail 122 may also be used with other aspects of the present disclosure. In some embodiments, the sidewall 170 defines apertures surrounded by ridges that form the shoulders 84, which can also engage the shoulders 62 of the rail 122 (or rails 22, 24 shown in FIGS. 2-8). For example, the sidewall 170 may be formed of a metal, and the ridges may be formed by stamping the metal to leave an aperture and the ridge forming the shoulder 84 of the sidewall 170.

In some embodiments, the rail 122 includes a spring member 86 that can help to laterally align the rail 122 relative to the sidewall 170 in a second direction orthogonal to the mounting direction. The second direction may also be orthogonal to the first direction of alignment of the spring members 98 (see FIG. 9) The spring members 86 may engage the same ridges that surround the apertures, which also form the shoulders 84 in sidewall 170. In some embodiments, the spring members 86 are integrally formed with the rail of the carrier.

Figure 11:
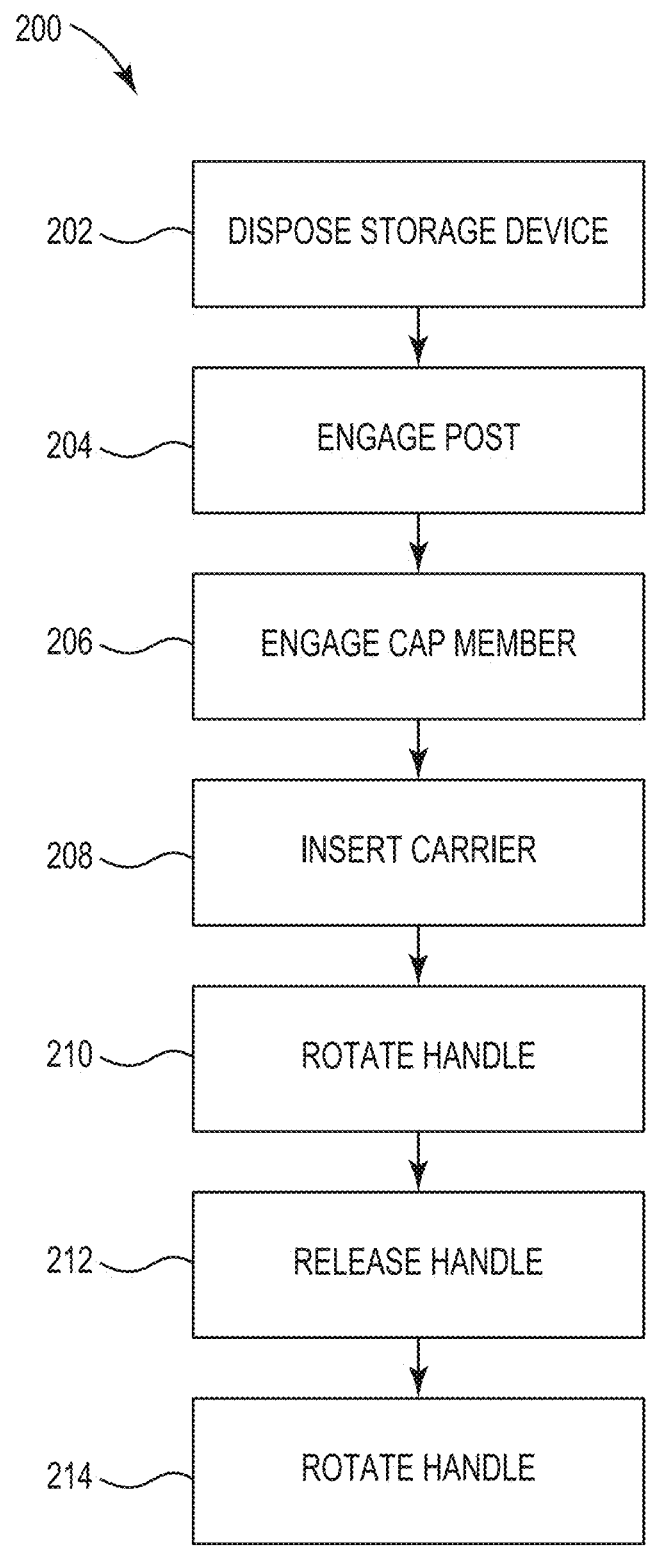
FIG. 11 is a schematic illustration of a method for using the enclosure system of FIG. 1.

Having described the various components of an enclosure system 10, FIG. 11 shows an example method 200 of using the enclosure system 10. Steps 202, 204, 206 relate to capturing the storage device. For example, in step 202, a storage device can be disposed in a carrier, for example, between two rails of the carrier. In step 204, posts on the rails of the carrier can be mated with recesses in the storage device defined by a standard, such as the SFF standard. In step 206, a cap member that is attached to one of the rails can be moved (e.g., rotated) and until the connected to the other rail, which secures the storage device between the rails.

Steps 208, 210 relate to mounting the storage device. For example, in step 208, the carrier having the storage device captured therein is inserted into an enclosure. A handle of the carrier may be in an unlocked position during insertion. In step 210, the handle is rotated to seat the storage device in the enclosure and connect the storage device to a circuit board in the enclosure.

Steps 212, 214 relate to unmounting the storage device. For example, in step 212, the handle is released from the cap member, at least at one end, by releasing a latch portion to unlock the handle. In step 214, the unlocked handle is rotated toward an unlocked position, which disconnects the storage device from the circuit board. The captured storage device may then be removed from the enclosure, and the carrier may be removed from the carrier.

Figure 12:
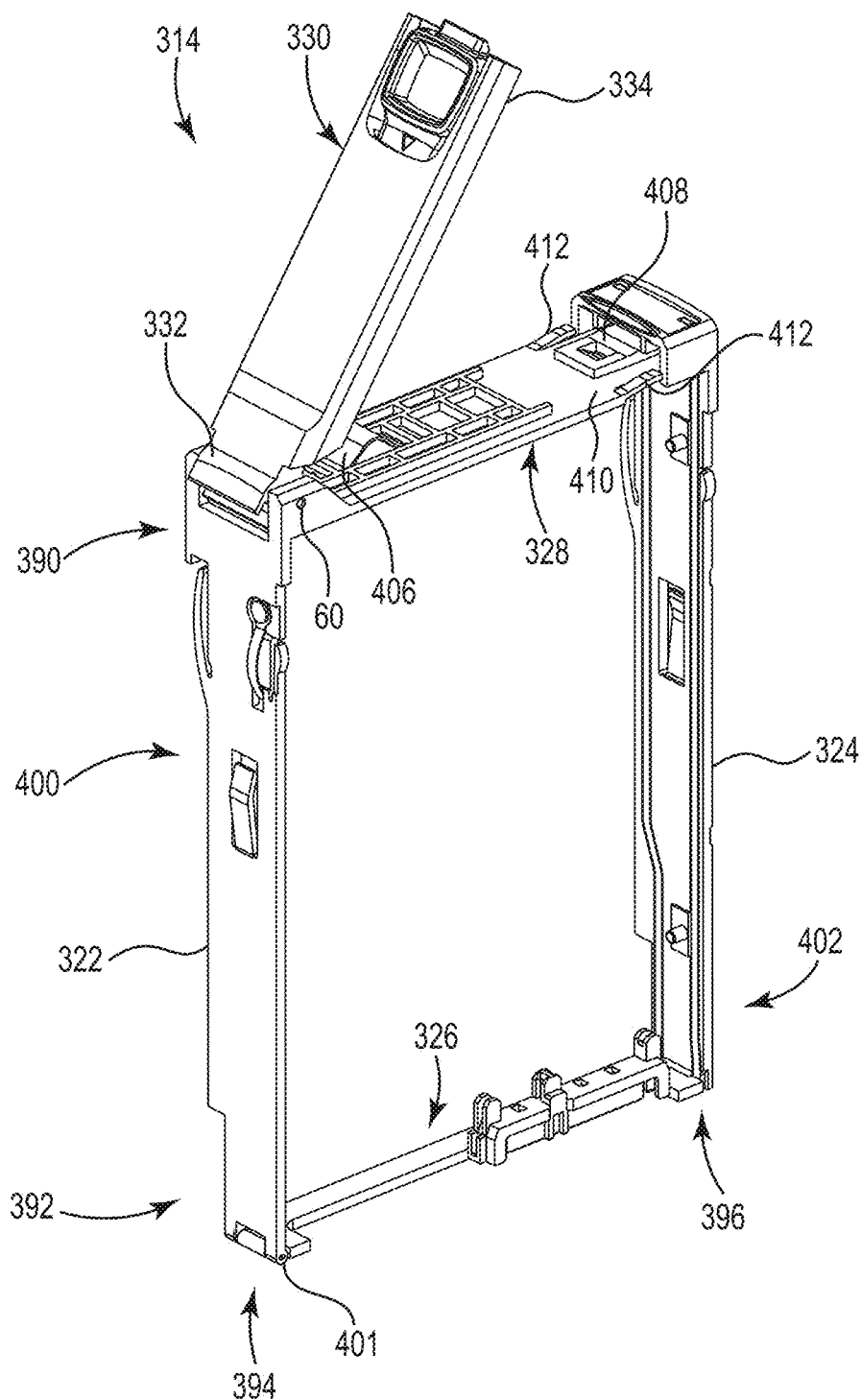
FIG. 12 is a perspective view of an alternative carrier with the handle in an unlocked position, according to the present disclosure.
Figure 13:
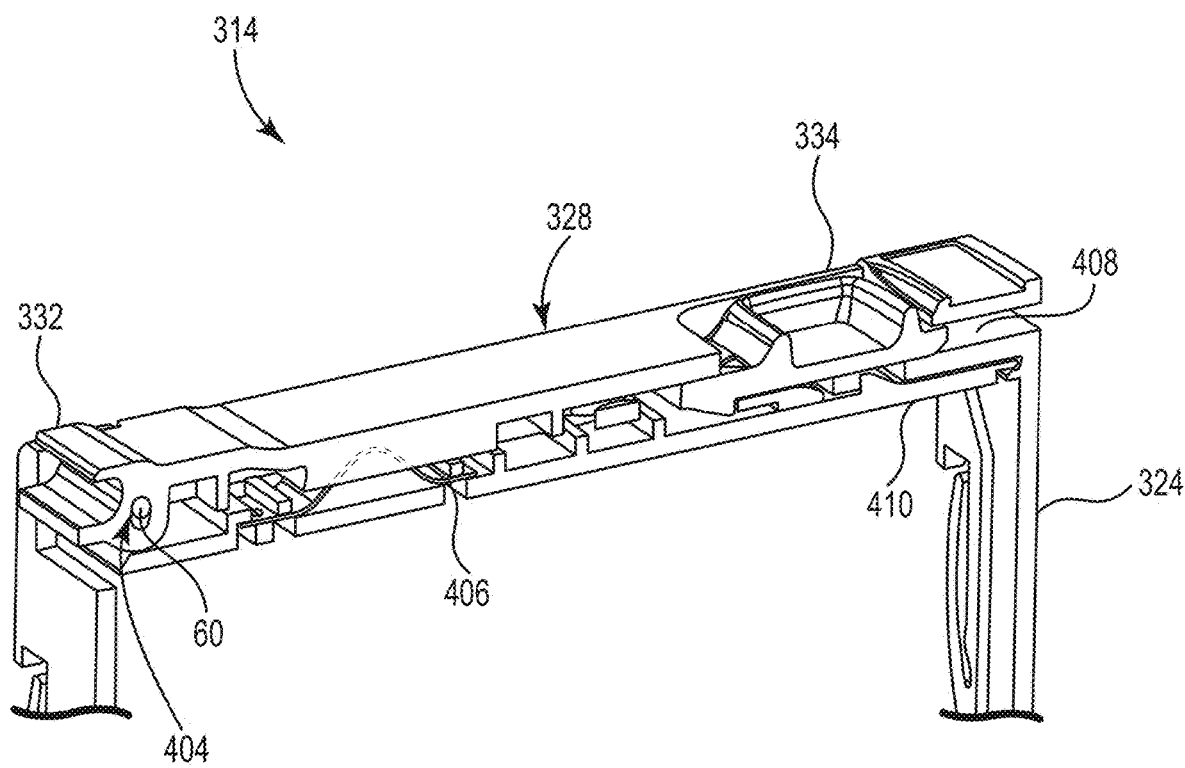
FIG. 13 is a partial cross-sectional perspective view of the carrier of FIG. 12 with the handle in a locked position.
Figure 14:
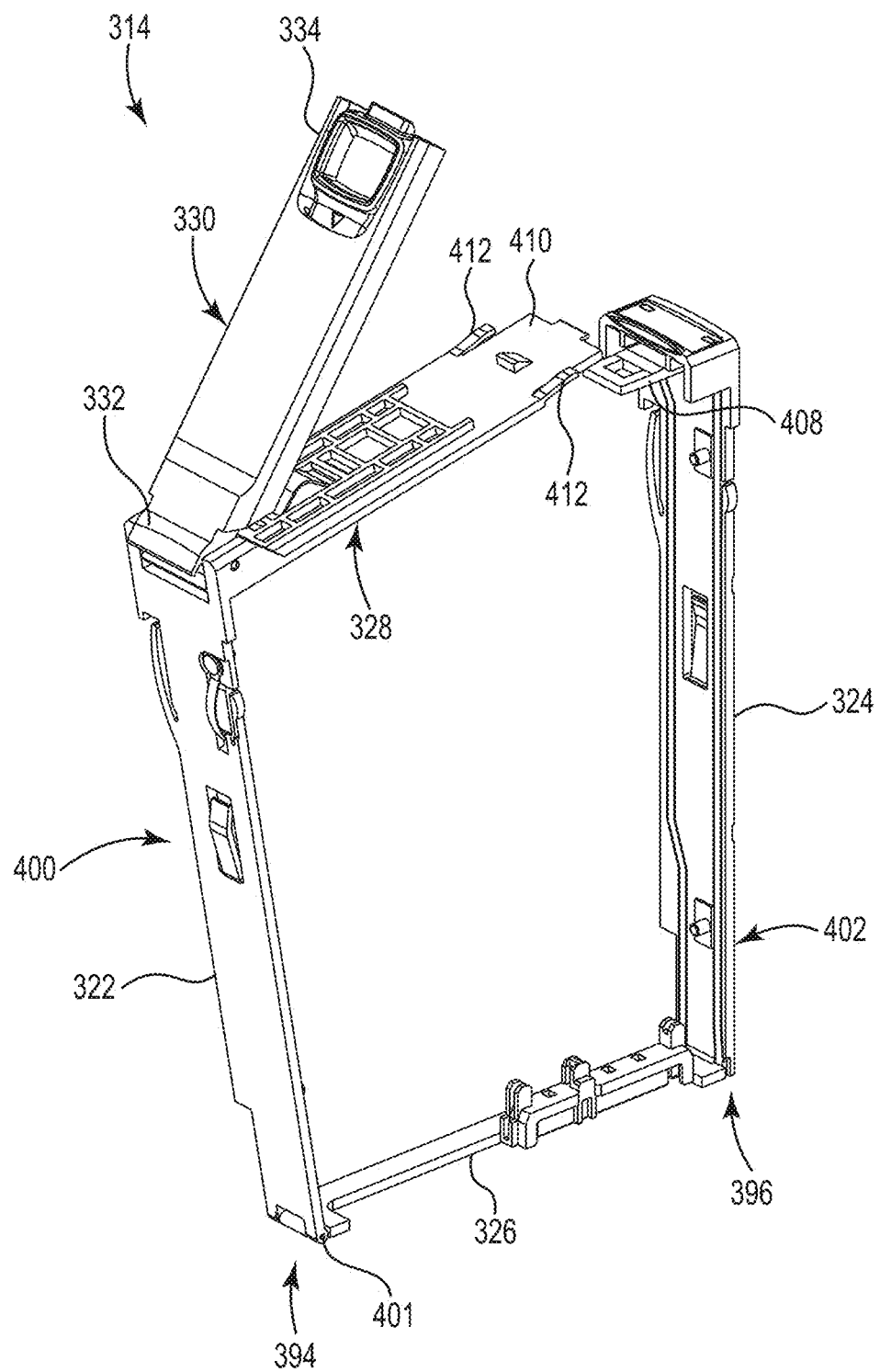
FIG. 14 is a perspective view of the carrier of FIG. 12 of the handle in an unlocked position and the cap member in an open position.

Various aspects of the enclosure system 10 may be used with other embodiments of carriers, such as a carrier 314 shown in FIGS. 12-14. The carrier 314 may be similar to the carrier 14 in many aspects except as described herein. The specific features of the carrier 314 are not limiting, and embodiments that include or exclude one or more aspects of the enclosure system 10 are also contemplated.

In some embodiments, similar to the carrier 14, the carrier 314 may include a first rail 322 and a second rail 324 extending between a front end 390 and a back end 392 of the carrier 314. The carrier 314 may define a first side 394 and a second side 396 opposite to the first side, which correspond to the first rail 322 and second rail 324, respectively. The carrier 314 may include a cap member 328 connected to the first rail 322 and releasably connected to the second rail 324 adjacent to the front end 390. The carrier may include a handle 330 with a cam portion 332 and a latch portion 334. The handle 330 may be rotatably connected to the cap member 328 by the pin 60. The cam portion 332 may be rotatably connected to the cap member 328 adjacent to the first side 394. The latch portion 334 may be releasably connected to the second rail 324 adjacent to the front end 390.

In some embodiments, different than carrier 14, the cap member 328 is non-rotatably connected to the first rail 322. The cap member 328 may extend orthogonally from the first rail 322 to define a first frame portion 400. The first frame portion 400 may be described as an "L" shape. In some embodiments, the carrier 314 includes a cross member 326 rotatably connected to the first rail 322. The cross member 326 may be non-rotatably connected to the second rail 324 adjacent to the back end 392 to define a second frame portion 402. The second frame portion 402 may be described as an "L" shape.

In some embodiments, the cross member 326 is flexible. For example, the cross member 326 may flex when securing a storage device (e.g., storage device 12) in the carrier 314. The cross member 326 may not need to flex as much as cross member 26 in the process of securing the storage device, for example, when the cross member 326 is rotatably connected to the first rail 322. The cross member 326 may rotate relative to the first rail 322 to allow the storage device to be secured.

The first frame portion 400 and the second frame portion 402 may cooperate to capture a storage device (e.g., storage device 12). In some embodiments, the first frame portion 400 and the second frame portion 402 are rotatably connected adjacent to the first side 394 and the back end 392. In some embodiments, the first frame portion 400 and the second frame portion 402 are rotatably connected by a pin 401.

In some embodiments, the cam portion 332 may include an elongate slot 404 for pin 60 to extend therethrough. The elongate slot 404 may allow the cam portion 328 to move in the mounting direction, for example, to relieve some of the stress on the handle 330 when the carrier 314 is mounted.

The cap member 328 may include a retention spring member 406. In some embodiments, the retention spring member 406 is disposed on the cap member 328 and be directed toward the handle 330. The retention spring member 406 may engage the handle 330 when the latch portion 334 is connected to the cap member 328 (e.g., when the handle 330 is locked). When the handle 330 is locked, the retention spring member 406 may compress. As perhaps best shown in FIG. 13, the retention spring member 406 may compress to about half the height of an uncompressed state when the handle 330 is locked.

The force of the retention spring member 406 may facilitate a secure mounting of the carrier 314. In some embodiments, the cam portion 328 may be restricted in movement when mounted due to the force of the retention spring member 406, the guidance of the elongate slot 404, and the corresponding receiving frame (e.g., frame 18) when mounted. Non-limiting examples of a retention spring member 406 include a leaf spring or a torsion spring. In some embodiments, the torsion spring may be disposed adjacent to or at the pivotal connection between the handle 330 and the cap member 328.

The carrier 314 may have a connection 342 instead of connection 42. Connection 342 may be a snap-fit connection. The connection 342 may include a portion 408 extending orthogonally from the second rail 324 having a first tab and an aperture. The connection 342 may include a complementary portion 410 at an end portion of the cap member 328 having a second tab with a protrusion. In some embodiments, to secure the storage device, the first tab can be pulled over the second tab and the aperture can slide over the protrusion. The portion 410 may further include one or more spring members 412 configured to engage the portion 408 of the second rail 324 providing a force to engage the cap member 328 with a surface of the storage device.

Thus, embodiments of the STORAGE DEVICE CARRIER AND RELATED SYSTEMS AND METHODS are disclosed. Although reference is made to the accompanying set of drawings that form a part hereof and in which are shown by way of illustration several specific embodiments, it is to be understood that other embodiments are contemplated and may be made without departing from (e.g., still falling within) the scope or spirit of the present disclosure. The detailed description, therefore, is not to be taken in a limiting sense.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The term "and/or" means one or all of the listed elements or a combination of any two or more of the listed elements (e.g., casting and/or treating an alloy means casting, treating, or both casting and treating the alloy).

The phrases "at least one of," "comprises at least one of," and "one or more of" followed by a list refers to any one of the items in the list and any combination of two or more items in the list.

What is claimed is:

1. An apparatus comprising:
   a first rail and a second rail configured to secure a storage device, the first and second rails extending between a front end and a back end, the first rail defining a first side and the second rail defining a side opposite to the first side;
   a cap member connected to the first rail and releasably connected to the second rail adjacent to the front end;
   a handle comprising a cam portion and a latch portion, the cam portion being rotatably connected to the cap member adjacent to the first side, the latch portion being releasably connected to at least one of the cap member adjacent to the second side and the second rail adjacent to the front end; and
   a cross member extending between a first end portion connected to the first rail and a second end portion connected to the second rail adjacent to the back end, wherein the cross member is non-rotatably connected to at least one of the first rail and the second rail, wherein the cross member is non-rotatably connected to the first and second rails adjacent to the back end and integrally formed from a single integral piece of material, wherein the cross member is configured to flex when securing a storage device to deflect the first rail away from the second rail.

2. The apparatus of claim 1, wherein the cam portion of the handle is further attached to the first rail.

3. The apparatus of claim 2, further comprising a pin configured to hinge the cap member, the handle, and the first rail about an axis.

4. The apparatus of claim 1, wherein the cap member is non-rotatably connected to the first rail and extends orthogonally from the first rail to define a first frame portion, and wherein the cross member is rotatably connected to the first rail and non-rotatably connected the second rail adjacent to the back end to define a second frame portion.

5. The apparatus of claim 1, wherein the cam portion comprises an elongate slot configured to receive a pin to rotatably attach the cam portion of the handle to the cap member, and wherein the cap member comprises a retention spring member configured to engage the handle and compress in a locked position.

6. The apparatus of claim 1, wherein a snap-fit connection is adjacent to the front end and attaches the second rail to the cap member.

7. The apparatus of claim 6, wherein the snap-fit connection comprises:
   two elongate prongs each extending through the cap member in a closed position; and
   two protrusions extending in opposite directions and orthogonally from one of the elongate prongs.

8. The apparatus of claim 6, wherein the snap-fit connection comprises:
   a first portion extending orthogonally from the second rail comprising a recess; and
   a second portion extending from the cap member comprising a protrusion.

9. The apparatus of claim 1, wherein the first and second rails each comprise a post extending inwardly, each post configured to mate with a recess in the storage device.

10. The apparatus of claim 1, wherein the cam portion comprises a resilient material configured to flex in a locked position of the handle.

11. A system comprising:
    a receiving frame comprising a sidewall defining a locking member, the locking member defining a front surface and a back surface; and
    a carrier configured to capture a storage device, the carrier further configured to be slidably received by the receiving frame in a mounting direction, the carrier comprising:
        a first rail defining a first side and a second rail defining a second side opposite to the first side, the first and second rails extending in the mounting direction;
        a cap member extending orthogonal to the mounting direction, the cap member being connected to the first rail and releasably connected to the second rail adjacent to the front end;
        a handle comprising a cam portion and a latch portion, the cam portion being rotatably connected to the cap member adjacent to the first side, the latch portion being releasably connected to at least one of the cap member adjacent to the second side and the second rail adjacent to the front end, the cam portion comprising a first cam and a second cam, the first cam being configured to engage the back surface when the carrier is mounted to the receiving frame, the second cam being configured to engage the front surface to unmount the carrier from the receiving frame; and
    a cross member extending between a first end portion connected to the first rail and a second end portion connected to the second rail adjacent to the back end, wherein the cross member is non-rotatably connected to at least one of the first rail and the second rail, wherein the cross member is non-rotatably connected to the first and second rails adjacent to the back end and integrally formed from a single integral piece of material, wherein the cross member is configured to flex when securing a storage device to deflect the first rail away from the second rail.

12. The system of claim 11, wherein the first cam is formed of a resilient deformable material and the first cam deforms when the carrier is mounted to the receiving frame.

13. The system of claim 11, wherein the sidewall of the receiving frame defines a shoulder configured to engage the rail of the carrier, the shoulder configured to relieve pressure on a circuit board when the carrier is mounted to the receiving frame.

14. The system of claim 11, wherein the sidewall of the receiving frame includes a spring member configured to laterally align the carrier when mounting to the receiving frame in a first direction orthogonal to the mounting direction.

15. The system of claim 11, wherein the rail of the carrier comprises a spring member configured to engage the sidewall of the receiving frame, the spring member configured to laterally align the carrier when mounting to the receiving frame in a second direction orthogonal to the mounting direction.

16. The system of claim 15, wherein the spring member is integrally formed with the rail of the carrier.

17. The apparatus of claim 1, wherein the cam portion comprises a first cam and a second cam, the first cam being configured to engage a back surface of a receiving frame when mounted to the receiving frame, the second cam being configured to engage a front surface of the receiving frame to unmount from the receiving frame.

18. The apparatus of claim 1, wherein the first rail comprises a spring member configured to engage a sidewall of a receiving frame, the spring member configured to laterally align when mounting to the receiving frame in a second direction orthogonal to a mounting direction to slidably be inserted into the receiving frame.

19. The apparatus of claim 18, wherein the spring member is integrally formed with the first rail.

* * * * *